Dec. 25, 1934.   H. T. HARRISON   1,985,825
DISK CLUTCH
Filed Nov. 9, 1933   2 Sheets—Sheet 1

Inventor:
Herbert Thomas Harrison,
By Mawhinney & Mawhinney,
Attys.

Dec. 25, 1934.  H. T. HARRISON  1,985,825
DISK CLUTCH
Filed Nov. 9, 1933  2 Sheets-Sheet 2
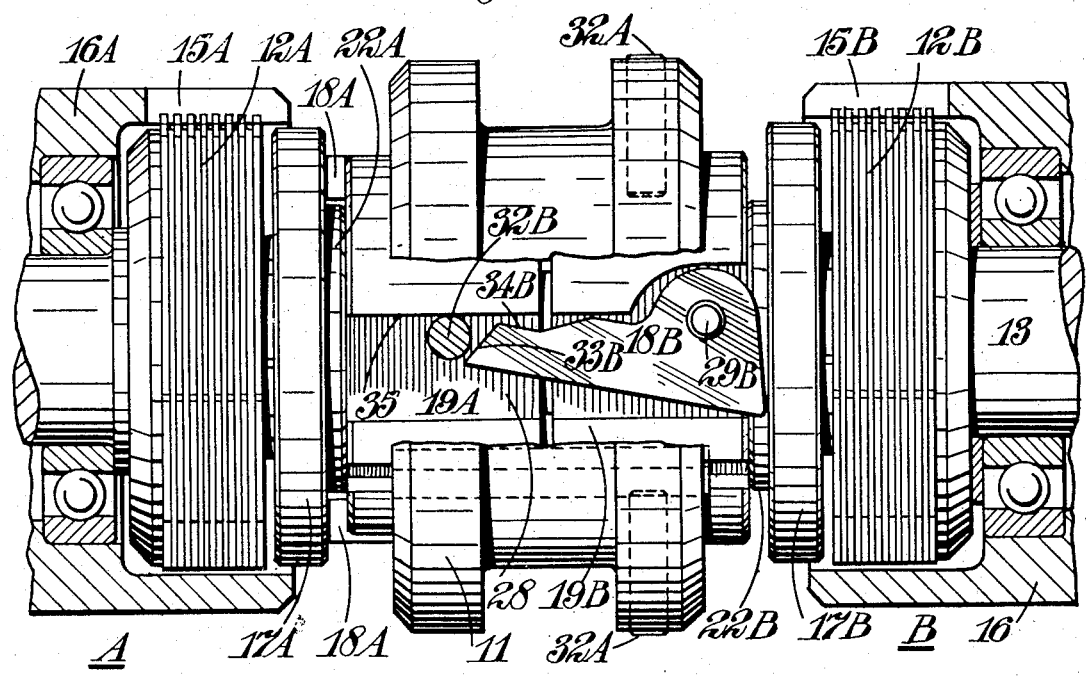
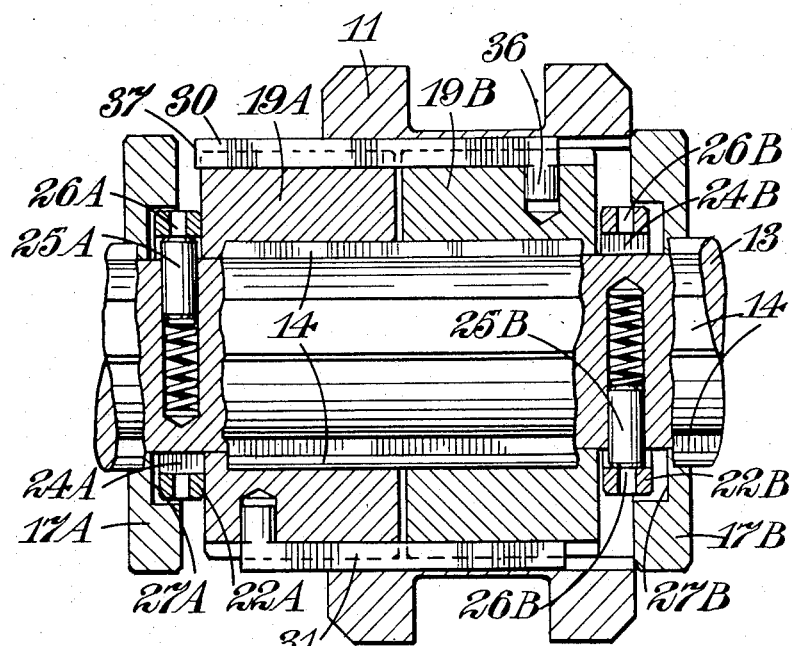
Inventor:
Herbert Thomas Harrison,
By Mawhinney & Mawhinney,
Attys.

Patented Dec. 25, 1934

1,985,825

UNITED STATES PATENT OFFICE 1,985,825

DISK CLUTCH

Herbert Thomas Harrison, Coventry, England, assignor to Alfred Herbert Limited, Coventry, England Application November 9, 1933, Serial No. 697,341
In Great Britain July 19, 1933

3 Claims. (Cl. 192—20)

This invention relates to disk clutches, and particularly to multi-disk clutches, of the kind including co-operating driving and driven disks which are relatively slidable axially into engagement with one another by means of a lever, the lever and actuating means therefor being arranged so that the clutch will remain engaged without any reaction being taken by the actuating means. In practice there are usually at least two levers arranged symmetrically round and more or less parallel to the axis of the clutch, each lever having an arm with an inclined end engaged by a pin carried by a slidable actuating collar as the clutch is being engaged and a straight portion engaged by the pin when the clutch is engaged.

The main object of the present invention is to provide an improved arrangement by which the clutch will be self-adjusting as regards wear and able to slip when a predetermined overload is encountered.

According to the invention, the driving and driven disks are slid relatively into engagement with one another against the reaction of a spring device, and by this means compensation is provided for wear in the clutch disks. Furthermore, a clutch adapted in this manner is able to slip on a predetermined overload which is of great advantage in certain cases, particularly when applied to the drive of a machine-tool.

In the accompanying drawings:—

Figure 4 is mainly a longitudinal elevation with a part in section taken on the line IV—IV of Figure 2, both clutches being shown released; and Figure 5 is a fragmentary longitudinal section taken on the line V—V of Figure 2.

Figure 1:
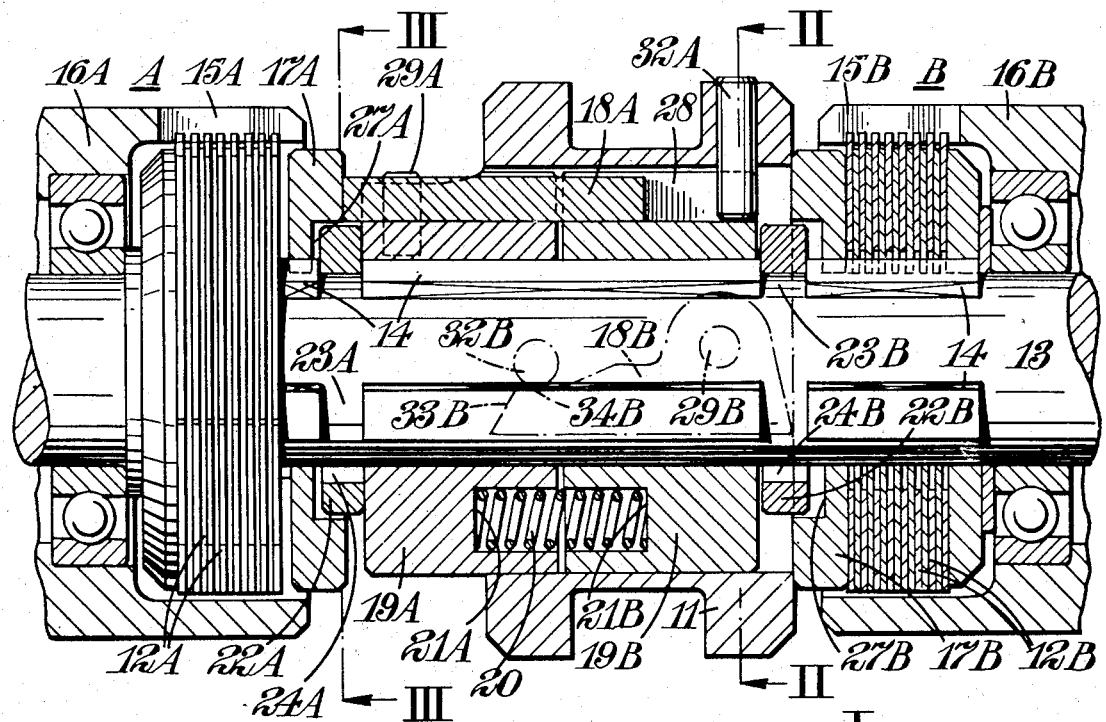
Figure 1 is a longitudinal section through a pair of similar but oppositely-arranged clutches, with an intermediate actuating means, adapted according to the invention, the section being taken partly on the line I—I of Figure 2 and the left-hand clutch being shown free and the right-hand one engaged.
Figure 2:
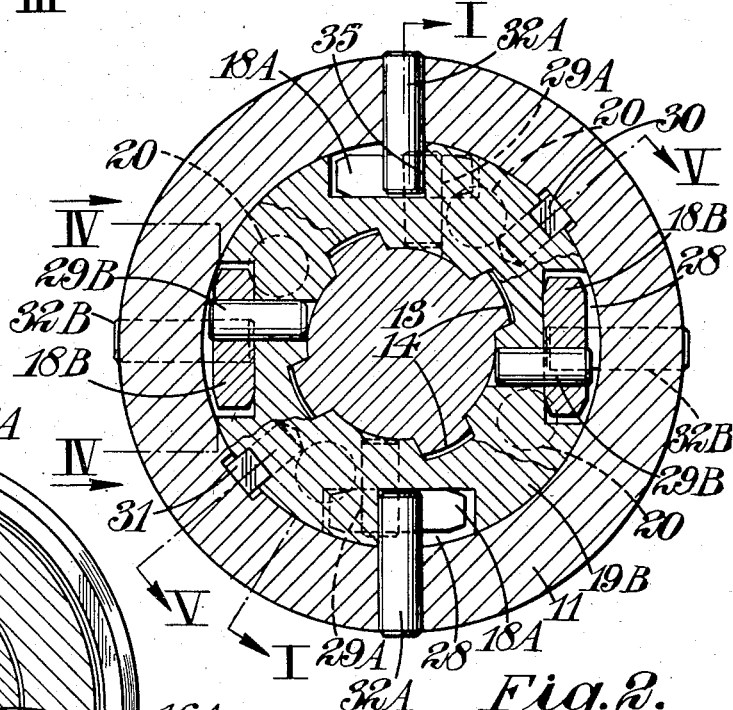
Figure 2 is a cross-section taken on the line II—II of Figure 1.
Figure 3:
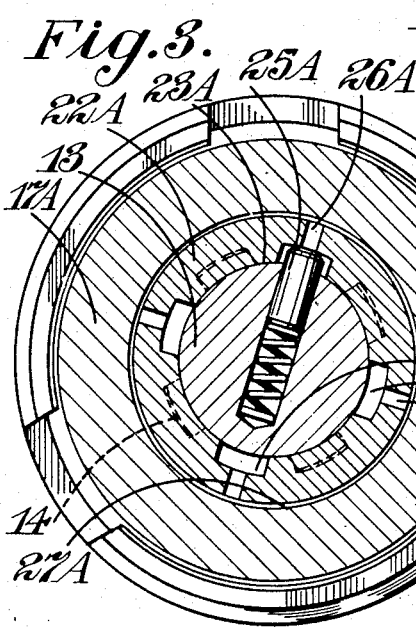
Figure 3 is a cross-section taken on the line III—III of Figure 1.

In the construction illustrated, similar multi-disk clutches A, B are arranged for selective operation on opposite sides of an actuating means therefor, this actuating means including a collar 11 which is slidable in either direction to effect engagement of the adjacent clutch. As the two clutches are identical, in the following description one reference numeral is used to designate similar parts in the two clutches followed by the letter A or B according to the clutch referred to; except when a part of the mechanism is common to both clutches when no suffix letter is used. Only clutch B will be particularly described.

The clutch disks of clutch B are annuli 12B arranged around a shaft 13, each alternate one being splined thereon at 14 while the remainder are keyed at 15B to an external co-axial sleeve 16B which, when the clutch is engaged, will be connected with the shaft 13. Against the inner face of the clutch and mounted on the same splines 14 is a presser-plate 17B engaged by the operating levers 18B of which there are conveniently two.

Between the two clutches is a clutch body comprising two similar co-axial body parts 19A, 19B splined at 14 on the shaft and biased away from one another by a number of interposed coil springs 20 arranged symmetrically in recesses 21A, 21B around and parallel to the shaft, four such springs being here indicated. The body parts are located against outward movement by means of locating collars 22A, 22B. For this purpose the shaft is conveniently formed with two peripheral rings 23A, 23B where the splines 14 are removed between the clutch body and the adjacent clutches, respectively, and the locating collars are grooved internally at 24A, 24B correspondingly to the splines 14 and slipped on the shaft from opposite end before the clutch disks are assembled thereon, the collars then being turned to bring their grooves out of alignment with the splines 14 on the shaft. In this position the collars are locked, as by spring plungers 25A, 25B extending radially of the shaft. In this case, when a locating collar 22B is to be disassembled, a pin or other implement is pushed through a hole 26B in the locating collar into contact with the plunger to depress it and allow of the locating collar being twisted till its grooves are in alignment with the splines 14 of the shaft.

In this way the two body portions 19A, 19B are located against moving outwardly towards the adjacent clutches but they are held spaced slightly from one another against the locating collars by the pressure of the springs 20. The collars, it will be noted, fit partly into recesses 27A, 27B in the adjacent presser-plates 17A, 17B.

The body part 19B carries the two opposed levers 18B for the operation of the clutch B, the levers being disposed in external recesses 28 of the body parts for movement about pivots 29B which are more or less radially arranged.

Slidably keyed at 30, 31 on the body parts is the actuating collar 11 formed with two pairs of inwardly-extending pins of which one pair 32B co-operate with the pair of levers 18B associated with the clutch B and the other pair 32A with the levers 18A associated with the clutch A. The extremities of the arms of the levers 18B are inclined, as shown at 33B, so that when the actuating collar is slid in one direction (to the right in Figure 1) to cause the associated pair of pins 32B to engage the inclined extremities, these levers 18B will be rocked in a direction to force the adjacent presser-plate 17B to effect engagement of the clutch B. Further movement of the actuating collar in this direction carries the pins along a flat part 34B on each lever 18B so that no reaction is applied to the actuating collar when the clutch B is fully engaged. The angular thrust applied to the pins can be taken by these engaging the straight edges 35 of the body recesses 28 in which the levers lie. Meanwhile the other pair of pins 32A is quite clear of the extremities of the other pair of levers 18A.

While the clutch B is being engaged in this way the reaction is being taken by the pivotal mounting 29B of the levers 18B, and as these latter are mounted in the body part 19B, the reaction is taken by the springs 20 spacing the two body parts 19A, 19B. These springs can be of any desired strength.

When both clutches are released, as shown in Figure 4, the pins 32A are just clear of the arms of the levers 18A and the pins 32B just clear of the levers 18B.

As a matter of convenience one of the keys 30 between the actuating collar 11 and the body parts may have a head 36 located in one of the body parts and be arranged to extend slightly beyond the outer face of the other (when either clutch is engaged) as shown at 37 so as to give a visual indication of the relative position of the two body parts and therefore of the wear that has taken place. As wear occurs in either clutch the body parts become spaced further from one another and the key 30 will therefore extend clear of the body parts to a less amount.

With this arrangement one set of springs 20 provides the necessary pressure for two clutches, and the springs are compactly disposed without the size of the mechanism being increased, which would be necessary if independent springs were provided for each clutch, for example, at the outer ends of the clutches.

Thus, by means of the invention, not only is wear automatically taken up but an indication of this wear is given in a very simple manner, and, in addition, the clutch can always slip when it is subjected to a predetermined overload.

What I claim as my invention and desire to secure by Letters Patent of the United States is:—

1. In combination, a pair of oppositely-arranged clutches, actuating means therefor, slidable supports carrying said actuating means and arranged adjacent one another between the clutches, springs biassing said slidable supports apart, and means located with respect to one of said supports and slidably co-operating with the other so as to give an indication of the spacing between said supports when a clutch is engaged.

2. In combination, a pair of oppositely-arranged clutches, actuating means therefor, slidable supports carrying said actuating means and arranged adjacent one another between the clutches, springs biassing said slidable supports apart, and a key located in one of said supports and sliding in the other, said key being arranged to slightly extend beyond said other support when either clutch is engaged.

3. In combination, a pair of oppositely-arranged clutches with a shaft, actuating means therefor, slidable supports carrying said actuating means and arranged adjacent one another between the clutches, springs biassing said slidable supports apart, means located with respect to one of said supports and slidably co-operating with the other so as to give an indication of the spacing between said supports when a clutch is engaged, and abutments on said shaft between the clutches and slidable supports adapted to limit the movement of said slidable supports.

HERBERT THOMAS HARRISON.